(12) United States Patent
Arvidsson

(10) Patent No.: US 10,150,482 B2
(45) Date of Patent: Dec. 11, 2018

(54) CONTROL OF ELECTRIC MOTOR

(71) Applicant: Volvo Car Corporation, Gothenburg (SE)

(72) Inventor: Rickard Arvidsson, Odsmal (SE)

(73) Assignee: Volvo Car Corporation, Gothenburg (SE)

( * ) Notice: Subject to any disclaimer, the term of this patent is extended or adjusted under 35 U.S.C. 154(b) by 137 days.

(21) Appl. No.: 15/332,543

(22) Filed: Oct. 24, 2016

(65) Prior Publication Data

US 2017/0183014 A1   Jun. 29, 2017

(30) Foreign Application Priority Data

Dec. 23, 2015   (EP) ..................................... 15202309

(51) Int. Cl.

| | |
|---|---|
| *B60W 10/113* | (2012.01) |
| *B60W 30/19* | (2012.01) |
| *B60W 10/08* | (2006.01) |
| *B60W 20/00* | (2016.01) |
| *F16H 61/04* | (2006.01) |
| *B60K 6/36* | (2007.10) |
| *B60K 6/48* | (2007.10) |
| *B60K 6/547* | (2007.10) |
| *F16H 3/00* | (2006.01) |

(Continued)

(52) U.S. Cl.

CPC ............ *B60W 30/19* (2013.01); *B60W 10/08* (2013.01); *B60W 10/113* (2013.01); *B60W 20/00* (2013.01); *F16H 61/0403* (2013.01); *B60K 6/36* (2013.01); *B60K 6/48* (2013.01); *B60K 6/547* (2013.01); *B60K 2006/4825* (2013.01); *B60W 2510/081* (2013.01); *B60W 2510/1015* (2013.01); *B60W 2710/081* (2013.01); *B60W 2710/083* (2013.01); *B60W 2710/1005* (2013.01); *B60Y 2200/92* (2013.01); *B60Y 2300/19* (2013.01); *F16H 3/006* (2013.01); *F16H 3/091* (2013.01); *F16H 61/688* (2013.01); *F16H 2061/0422* (2013.01); *Y10S 903/93* (2013.01)

(58) Field of Classification Search

CPC .... B60W 30/19; B60W 10/08; B60W 10/113; B60W 20/00
USPC .......................................................... 701/22
See application file for complete search history.

(56) References Cited

U.S. PATENT DOCUMENTS

| | | |
|---|---|---|
| 6,006,620 A | 12/1999 | Lawrie et al. |
| 6,319,168 B1 | 11/2001 | Morris et al. |

(Continued)

*Primary Examiner* — Muhammad Shafi
(74) *Attorney, Agent, or Firm* — Snyder, Clark, Lesch & Chung, LLP

(57) ABSTRACT

A method for controlling an electric machine (EM) during a synchronization procedure of a first shaft and a second shaft, whereby said first shaft is in drive connection with an output shaft of said electric machine (EM) and said first shaft and said second shaft are connectable over a synchronization mechanism, comprising: controlling the output shaft to a speed (na) close to a target speed (nt) of said second shaft by using speed control; continuously controlling an electrical torque of said electrical machine (EM), such that an output torque (Tout) of said electric machine (EM) becomes essentially equal to zero; and controlling said synchronization mechanism to synchronize the speed of the first shaft and the second shaft.

7 Claims, 5 Drawing Sheets

(51) Int. Cl.
    *F16H 3/091*         (2006.01)
    *F16H 61/688*      (2006.01)

(56) References Cited

U.S. PATENT DOCUMENTS

| | | | | |
|---|---|---|---|---|
| 8,532,858 | B1* | 9/2013 | Robinette | B60K 6/442 |
| | | | | 701/22 |
| 2005/0072256 | A1* | 4/2005 | Ibamoto | B60K 6/48 |
| | | | | 74/339 |
| 2007/0113693 | A1* | 5/2007 | Chen | F16H 3/006 |
| | | | | 74/331 |
| 2007/0227282 | A1* | 10/2007 | Forsyth | F16H 3/006 |
| | | | | 74/330 |

* cited by examiner

CONTROL OF ELECTRIC MOTOR

TECHNICAL FIELD

The invention relates to a method to control an electric machine during a synchronisation procedure of a first and a second shaft, whereby the electrical machine is connected the first shaft.

BACKGROUND ART

When synchronising a first shaft connected to an electric machine with a second shaft, there can be very high load upon the synchronisation mechanism due to the inertia of the electric motor. This is especially a problem when the electrical machine is connected to the first shaft over a gear step, which increases a torque from the electric machine to the first shaft, i.e. also increase the effect of the inertia upon the first shaft.

SUMMARY OF THE INVENTION

The object of the invention is to suggest a solution on how to achieve a synchronisation of a first shaft with a second shaft, where the first shaft is connected to an electrical machine, without risking any damages upon the synchronisation mechanism.

The object is achieved through an inventive method to control an electric machine during a synchronisation procedure of a first and a second shaft. The first shaft is in drive connection with an output shaft of the electric machine and the first and said second shaft is connectable over a synchronisation mechanism. To control the electrical machine the following is performed: controlling output shaft of the electrical machine to a speed essentially corresponding a target speed of the second shaft by using speed control and continuously; controlling an electrical torque of the electrical machine, such that an output torque from the electric machine becomes essentially equal to zero; and controlling the synchronisation mechanism to synchronise the speed of the first and the second shaft.

By first controlling the speed of the output shaft of the electrical machine to essentially a target speed of the second shaft, using speed control of the electrical machine, a speed of the first shaft is achieved, which is close to a synchronised speed with the second shaft. Due to that the speed control is used a fully synchronised speed between the first and the second shaft is not achieved, because the speed control is based upon a regulation error.

However, the speed control is followed up with a torque control of the electrical machine. By continuously controlling the output torque of the electrical machine to zero during the synchronisation procedure of the synchronisation mechanism, there will be essentially no torque load from the inertia of the electrical machine during the synchronisation of the first and the second shaft. Independently if there is a negative or a positive torque upon the output shaft of the electrical machine, the control mechanism will control the machine such that the torque contribution from the electrical machine will be zero.

The counteracting torque can be described as $T = I \cdot w\_dot \cdot Rt^2$, where T is the counteracting torque, I is the inertia of the electrical machine, w_dot is the change in speed of the first shaft caused by the synchronisation mechanism during synchronisation with the second shaft and $Rt^2$ is the gear ratio between the electrical machine and the first input shaft.

By applying the described method, the load contribution upon the synchronisation mechanism from the electrical machine will be reduced to essentially zero, whereby the wear of the synchronisation mechanism will be reduced and thereby also the life cycle of the same be increased.

In one aspect of the method, it further comprises: continuously measuring an actual speed of first shaft, whereby the controlling an output Torque of said electrical machine is performed dependent on any changes of said actual speed of said first shaft.

By continuously measuring the actual speed of the first shaft, a signal of any speed change of the first shaft can be fed to the electrical machine controller, whereby the electrical torque of the electrical machine can be controlled with a feedback control of the actual speed change of the first shaft, in order to achieve an output torque of the electrical machine to become essentially zero due to that the inertia the rotor of the electrical machine, caused by the speed change is cancelled out.

In another aspect of the method, it further comprises continuously measuring a position of the synchronising mechanism, an actual speed of the first shaft and an actual speed of the second shaft, and controlling an output Torque of the electrical machine is performed first when the synchronisation mechanism reaches a predetermined position, whereby the output torque of the electrical machine is dependent on a difference between the actual speed of the first shaft and an actual speed of said second shaft.

In this aspect of the method, the torque control can be performed without any delay. Continuously measuring the synchronising mechanism position assures that the torque control is started simultaneously as the synchronisation of the first and the second shaft start. The predetermined position is preferably the position of the synchronisation mechanism where the first torque can be transferred between the first and the second shaft. The position can be measured upon any of the moving parts of the synchronisation mechanism and preferably upon the control fork.

Through the speed difference between first and the second shaft the torque generated by the inertia of the electrical machine can be determined. The counteracting torque can be described as $T(w) = I\_EM \cdot (w1 - w2)/dt \cdot Rt^2$, where $T(n)$ is the counteracting torque, I_EM is the inertia of the rotor of the electrical machine, w1 is the angular velocity of the first shaft before synchronisation and w2 is target angular velocity of the first shaft after synchronisation, dt is the time of the synchronisation and $Rt^2$ is the gear ratio between the electrical machine and the first input shaft.

The method and the above algorithm can be used independently if there is any gear ratio in between the first shaft and the electrical motor or the electrical motor acts directly or with a 1:1 gear ratio upon the first shaft, by only multiply the torque with the gear ratio.

By applying this continuously measuring the actual speed of the first shaft and the second shaft and the position of the synchroniser, the electrical machine can be controlled with a feed forward control, whereby true zero torque contribution from the electrical machine can be achieved, without any delay.

The method can be applied to any electrical machine, which is connected to a first shaft to be synchronised with a second shaft. Advantageously, the method is applied in a transmission provided with an electrical machine, which output shaft is connected to an input shaft of the transmission. At least one gear is allocated to the input shaft and the gear can be synchronised with a synchronising mechanism.

Especially advantageously is the method when it is applied to a dual-clutch multi speed transmission, provided with an electrical machine connected to one of its input shafts.

The invention also relates to a computer readable medium carrying a computer program comprising program code means for performing the one or all aspects of the method when said program product is run on a computer.

Further, a control unit for controlling an electric machine of a hybrid vehicle provided with a transmission and an electrical machine as described above, is preferably configured to perform the aspects of the method.

BRIEF DESCRIPTION OF THE DRAWINGS

All drawings in the figures are schematic.

DETAILED DESCRIPTION

Figure 1:
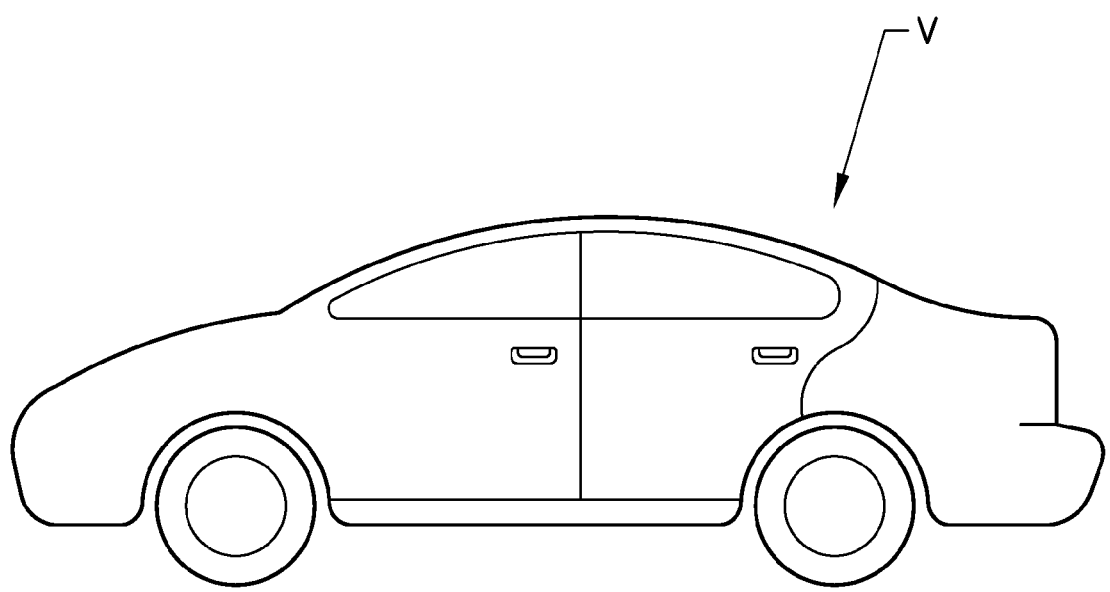
FIG. 1 discloses a vehicle.
Figure 2:
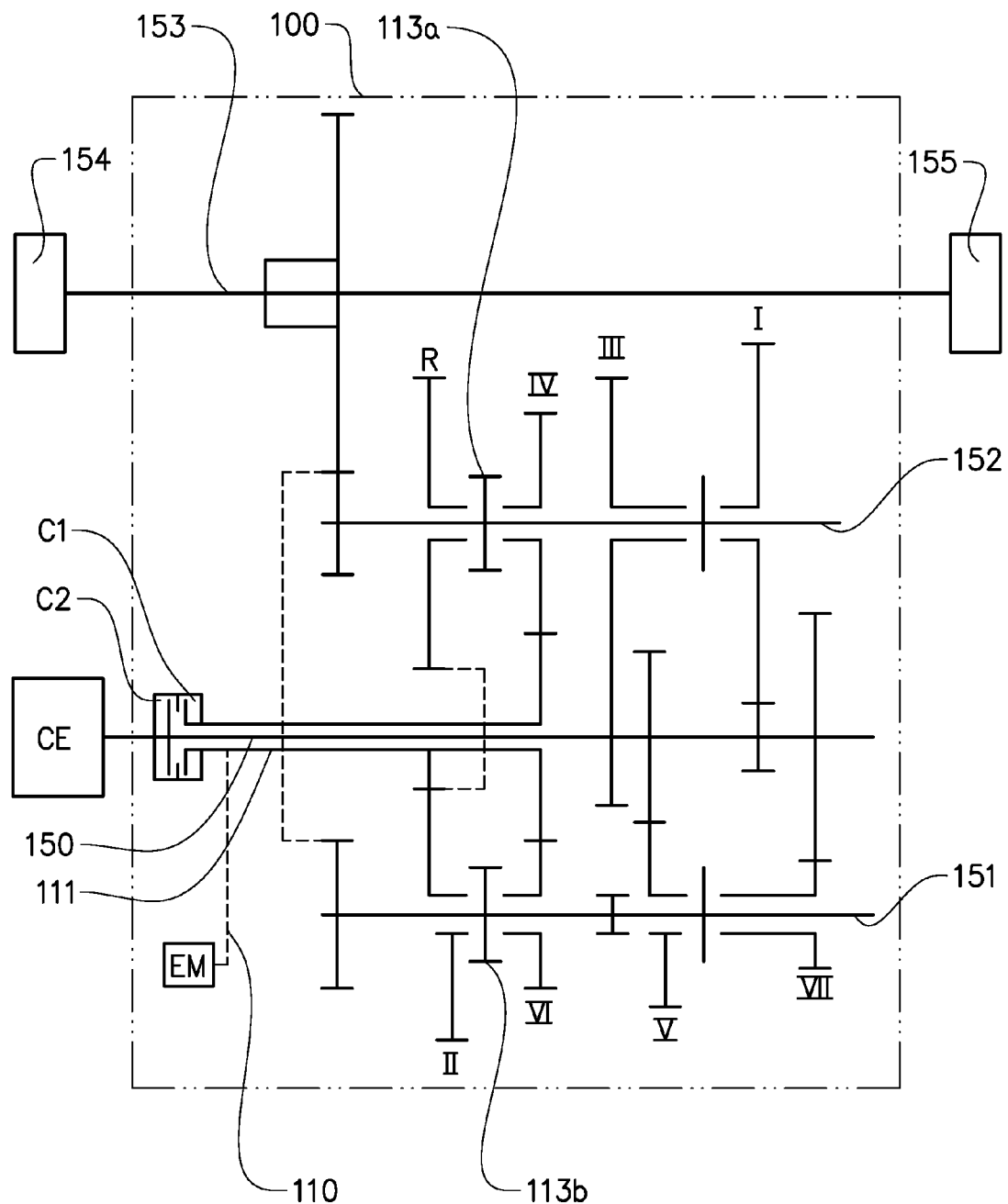
FIG. 2 discloses a dual-clutch transmission provided with an electrical machine.

FIG. 1 discloses a vehicle V, in which the transmission 10 disclosed in FIG. 2 can be provided and which transmission 2, can benefit from the method for controlling an electric machine EM.

Figure 3A:
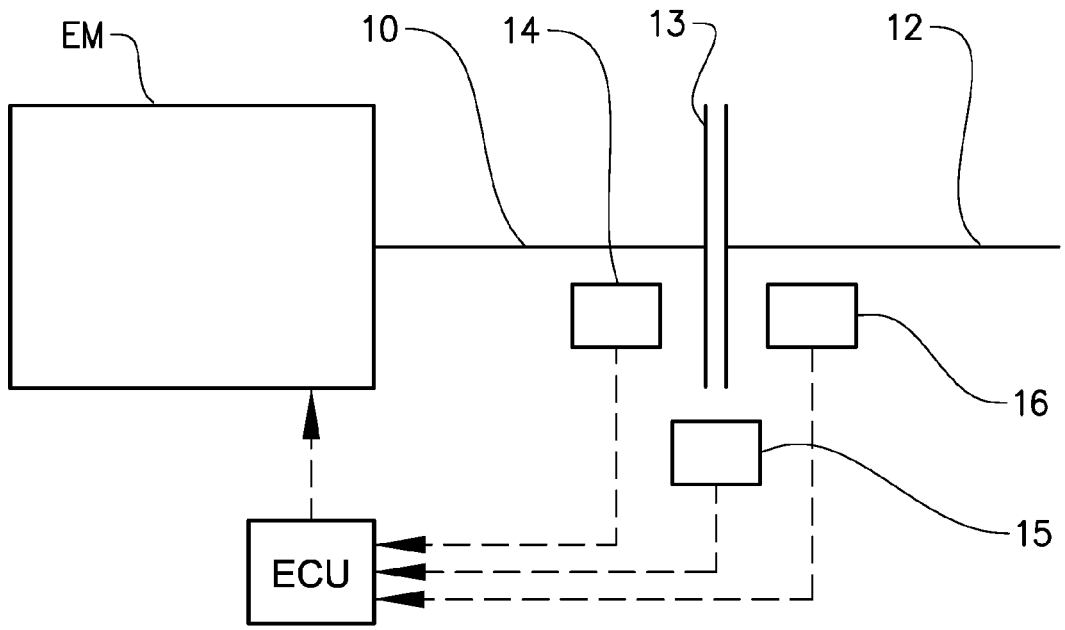
FIGS. 3*a* and 3*b* discloses two embodiments of the invention.

Now FIG. 3 discloses an electrical machine EM with an output shaft 10 connected to a first shaft 11. The first shaft can be connected to a second shaft 12 via a synchronisation mechanism 13. A first speed sensor 14 continuously measures the speed of the first shaft 11. A second speed sensor 16 continuously measures the speed of the second shaft 12. A position sensor 15 measures the position of the synchronisation mechanism 13. The position of the synchronisation mechanism 13 is preferably measured as the position of a control fork (not disclosed), however any position of a moveable part indicating the engagement state of the synchronisation mechanism 13 could be measured.

The signals from the sensors 14, 15, 16 are sent to the electronic control unit (ECU) ECU, which can control the electrical machine EM based on the input from the sensors 14, 15, 16. In one embodiment of the method, only the signal from the first speed sensor 14 is used, whereby the ECU controls the electric machine with a feedback control, such that a change in speed of the first shaft 11 (and consequently of the output shaft 10 of the electric machine) met by a torque control of the electric machine EM to counteract the torque from the inertia of the rotor of the electric machine EM caused by the change in speed.

In another embodiment of the method, signals from all three sensors 14, 15, 16 are used by the ECU to control the electric machine EM. When the signals from all three sensors 14, 15, 16 are used a feed forward control of the output torque of the electric machine EM can be achieved. A difference between the speed of the first shaft 11 and the speed of the second shaft 12 can be calculated by the ECU. Further, the speed difference together with a continuously monitoring of the position of the synchronisation mechanism 13, the ECU can predict the speed change of the first shaft 11 when it is synchronising with the speed of the second shaft 12, whereby the output torque of the electric machine EM can be controlled to 0 with essentially no delay. When the synchronisation mechanism 13 passes a predefined position (e.g. the position when the synchronisation mechanism 13 starts to transmit torque), the ECU can start controlling the electric machine, such that the torque caused by the inertia of the rotor at a speed change of the output shaft 10 can be counteracted. The output torque from the electrical machine EM can thereby continue to be zero during the whole synchronisation procedure.

Figure 3B:
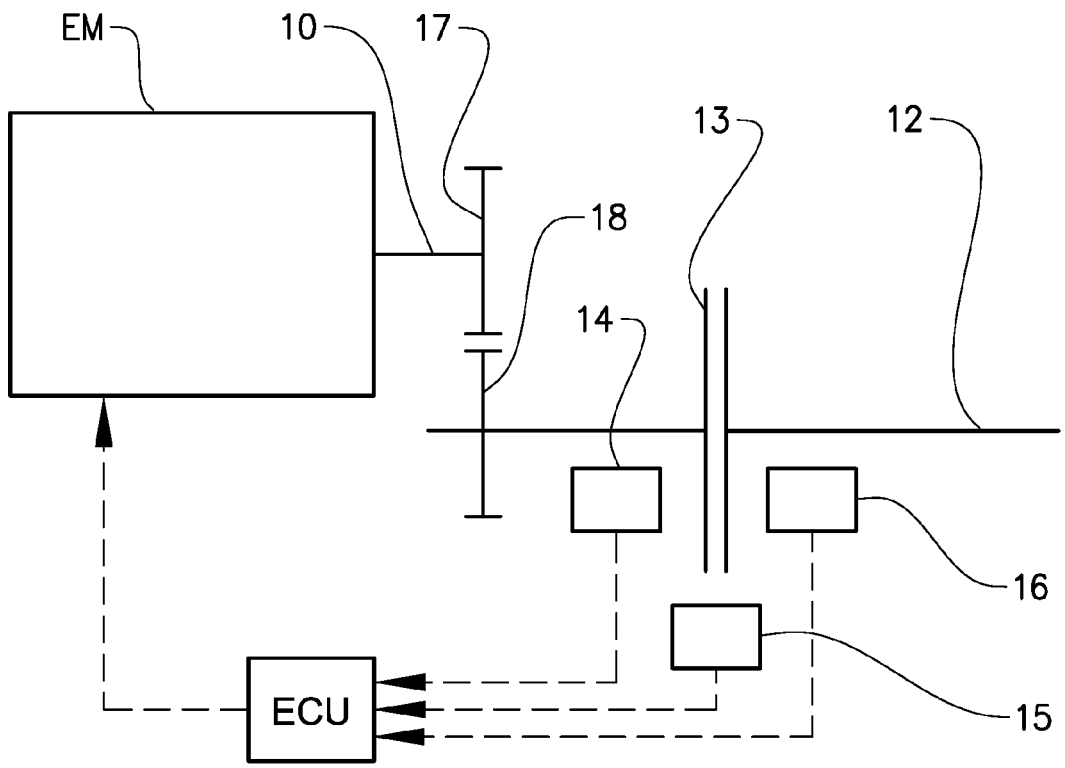

In FIG. 3*b*, an alternative design of how the electrical machine EM is connected to the first shaft 11 is disclosed. The output shaft 10 is connected to the first shaft 11 over a gear step 17, 18, whereby a gear ratio different from 1:1 can be achieved. When the gear ratio is such that the output torque of the electrical machine EM is increased over the gear step the benefits of the method is even greater, since the reduction in torque load upon the synchronisation mechanism 13 becomes higher. The method is however applied correspondingly, with the only modification that the speed of the output shaft 10 must be derived from the speed of the first shaft 11 with consideration of the gear ratio in the gear step 17, 18 between the output shaft 10 and the first shaft 11. Further gear steps of or other gear ratio changing means (e.g. chain, CVT) could be provided in between the electrical motor and the synchronisation mechanism 13, without effecting the scope of the invention.

In the dual-clutch transmission 100 disclosed in FIG. 2 the output shaft 110 of an electrical machine EM is connected to the first input shaft 111 of the dual-clutch transmission 100. The transmission 100 is further provided with a second input shaft 150 and a first and a second input clutch C1, C2 are allocated to the first and the second input shaft 111, 150 respectively. The input clutches C1, C2 connects the transmission 100 to an internal combustion engine CE. The transmission 100 is provided with two output shafts 151, 152, which are connected to a differential 153, which distribute the torque to the drive wheels 154, 155 of the vehicle V. The schematically disclosed dual-clutch transmission 100 in FIG. 2 is provided with 7 forward and one backward speed, I, II, III, IV, V, VI, VII, R, which are marked with roman letters in the figure. The general function of a dual-clutch transmission 100 is known and won't be described in further detail.

The output shaft 110 of the electrical machine EM is connected over a transfer transmission, such as the gear step 17, 18 disclosed in FIG. 3*b*, to the first input shaft 111. When any of the second, fourth, sixth or reverse gear (II, IV, VI, R) are synchronised, the rotor of the electrical machine EM are synchronised to. The disclosed method is used in order to minimise the load contribution from the inertia of the rotor of the electrical machine EM, on the synchronisation mechanisms 113*a*, 113*b*, during a synchronisation procedure of the any of the second, fourth, sixth or reverse gears II, IV, VI, R. It is understood that the electrical machine EM can be arranged elsewhere in the dual-clutch transmission 100 without departing from the scope of the invention, just as the method can be applied on other types of transmissions or for synchronising other gears.

Figure 4A:
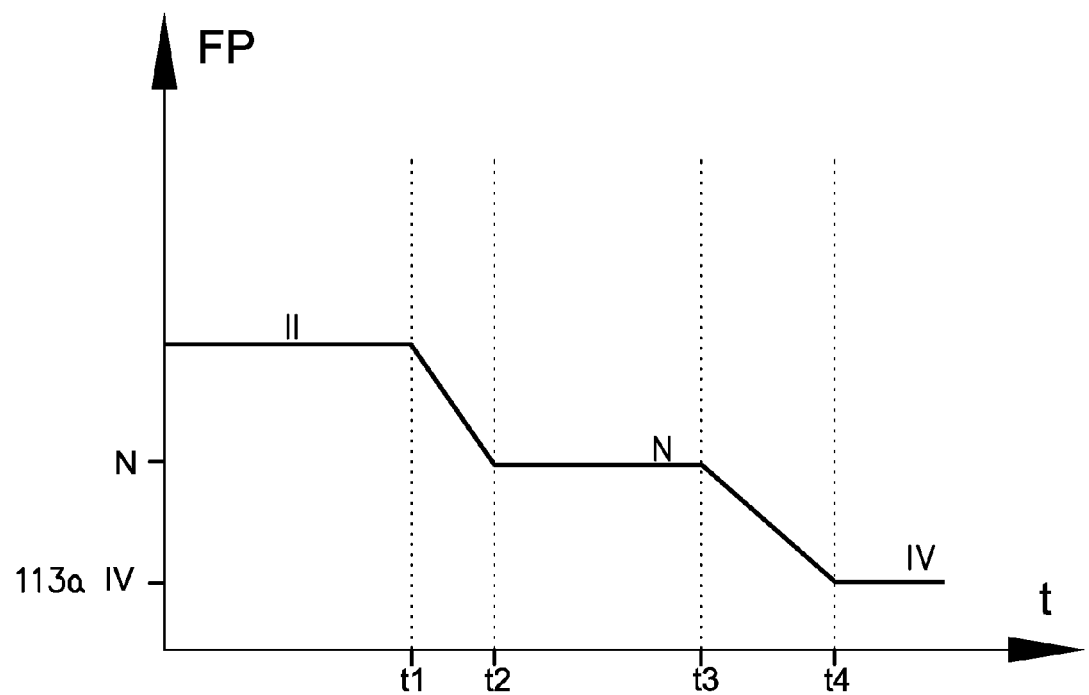
FIG. 4*a-c* disclose diagrams showing a fork position, an e-machine speed and a shaft torque during a shifting procedure.
Figure 4B:
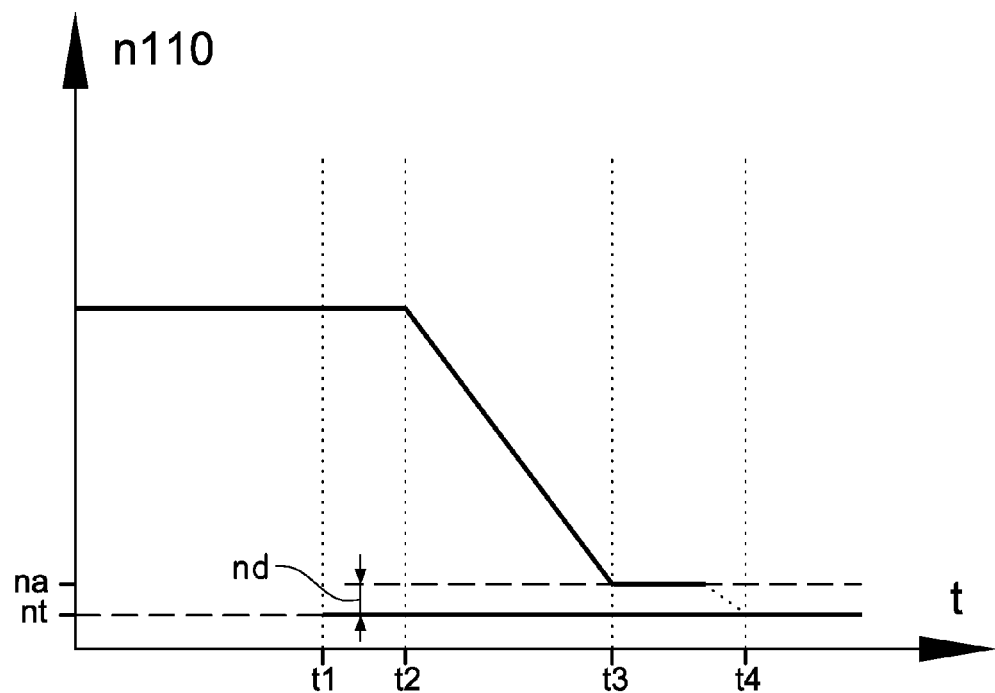
Figure 4C:
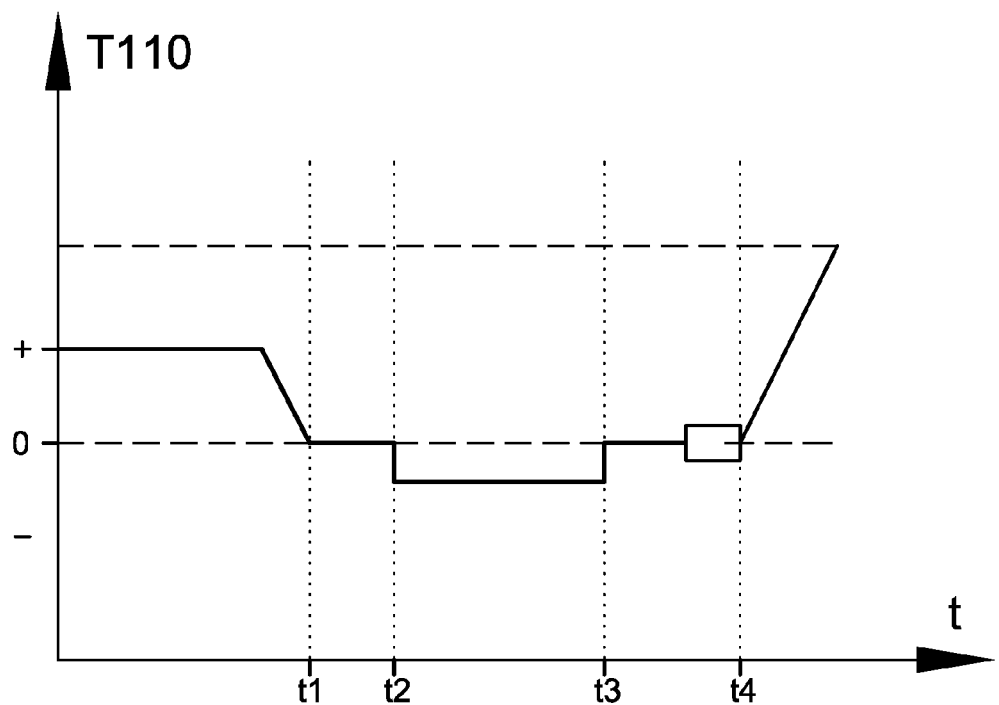
Figure 5:
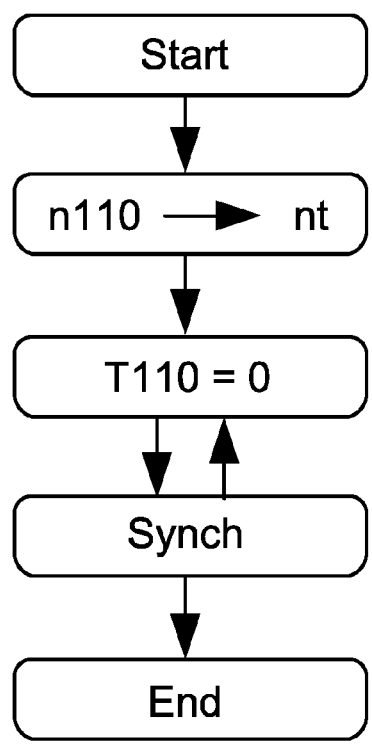
FIG. 5 discloses a flowchart of the method of the invention.

Now the method will be described in conjunction with FIGS. 4*a-c* and 5. In FIG. 4 a diagram disclosing a fork position FP (FIG. 4*a*), speed $n\_110$ of the output shaft 110 of electrical machine EM (FIG. 4*b*) and the torque T on the output shaft 110 of the electrical machine EM (FIG. 4*c*) is disclosed. In FIG. 5 the method steps of the method are disclosed. The method could for example be applied in the transmission 100 disclosed in FIG. 2, whereby references will be made to the transmission 100 in FIG. 2. However, diagrams for the corresponding values of the embodiments disclosed in FIGS. 3a and 3b, would have correspondent values.

In FIG. 4a the fork position FP, during shifting from a second gear II to a fourth gear IV, via a neutral position N is disclosed. Until the time t1 the synchronisation mechanism 113b is engaged with the second gear II, at which point it disengages. As can be seen in the diagram in FIG. 4c, the electrical machine EM has delivered torque to the drive line before the time t1. At t1, the output torque T110 has been decreased to zero.

Now, the transmission 100 is to engage the fourth gear IV, whereby the method starts at the time t2. The speed of the output shaft 110 of the electrical machine EM is thereby decreased to a speed na, close to a target speed nt, n110→nt. A more accurate speed is not possible to achieve with speed control of the electrical motor EM. The target speed nt of the output shaft 110 is the speed that is equal a synchronised speed for the gear to be activated. The speed control is performed during the time t2-t3, whereby the output shaft 110 of the electrical machine EM is subjected to a negative torque T110, induced by the electrical motor EM in order to reduce the speed. Between the target speed nt and the actual speed na is a speed difference nd. It is this speed difference that causes the inertia torque load upon the synchronisation mechanism 113a, 113b, during synchronisation of the gears. The speed difference nd is only schematically disclosed and varies from time to time and may also be lower than the target speed.

As can be seen in FIG. 4a, showing the fork positions, at t3, the synchronisation mechanism 113a starts to move to synchronise the fourth gear IV. Whereby during half the time between t3 and t4 the synchronisation mechanism 113a starts to transfer torque, whereby the output torque T110 of the electrical motor EM is controlled to be zero, i.e. to counteract the inertia torque on the output shaft 110, T110=0. The electrical motor EM is controlled using any of the disclosed embodiments to achieve the torque control T110=0 as long as the synchronisation of the fourth gear IV is performed. When a synchronised speed is achieved such that the fourth gear can be/is engaged and the speed of the output shaft 110 has reached the target speed nt, the method is ended at the time t4 and the electrical motor EM can start delivering torque to the drive train again.

In FIG. 4c disclosing the torque of the output shat 110, the torque T is disclosed to be both positive and negative over a time period just before the time t6. This symbolises the torque caused by the change in speed caused by the synchronisation of a gear and the counteracting torque caused by the electrical motor control, these two opposite directed torques counteracts each other, so that the resulting torque upon the output shaft 110 is zero.

The invention claimed is:

1. A method performed by an electronic control unit in a vehicle for controlling an electric machine during a synchronisation procedure of a first shaft and a second shaft, whereby said first shaft is in drive connection with an output shaft of said electric machine and said first shaft and said second shaft are connectable over a synchronisation mechanism, comprising:
controlling, by the electronic control unit, the output shaft to an actual speed close to a target speed of said second shaft by using speed control;
continuously controlling, by the electronic control unit, an electrical torque of said electric machine, such that a torque on said output shaft becomes essentially equal to zero during the synchronisation procedure of the synchronisation mechanism; and
controlling, by the electronic control unit, said synchronisation mechanism to synchronise the speed of the first shaft and the second shaft.

2. The method according to claim 1, further comprising: continuously measuring an actual speed of the first shaft, wherein controlling the electrical torque of said electrical machine is performed dependent on any changes of said actual speed of said first shaft.

3. The method according to claim 1, further comprising: continuously measuring a position of said synchronising mechanism, an actual speed of said first shaft, and an actual speed of said second shaft; and
controlling the output torque of said electrical machine when said synchronisation mechanism reaches a pre-determined position,
wherein said output torque of said electrical machine is dependent on a difference between said actual speed of said first shaft and an actual speed of said second shaft.

4. The method according to claim 3, wherein said output torque is based on said difference in actual speed between the first and the second shaft.

5. A vehicle comprising:
a transmission having an input shaft and a second shaft, wherein the input shaft and the second shaft are connected by a synchronisation mechanism;
an electrical machine having an output shaft, wherein said input shaft of the transmission is connected to said output shaft of said electrical machine;
at least one gear allocated to said input shaft, wherein said gear is synchronised with the synchronising mechanism; and
an electronic control unit for controlling the electrical machine during a synchronising procedure of the input shaft and the second shaft,
wherein the electrical control unit is configured to:
control the output shaft to an actual speed close to a target speed of said second shaft by using speed control;
continuously control an electrical torque of said electrical machine, such that a torque on said output shaft of said electrical machine becomes essentially equal to zero during the synchronisation procedure of the synchronisation mechanism; and
control said synchronisation mechanism to synchronise the speed of the input shaft and the second shaft.

6. The vehicle according to claim 5, wherein said transmission is a dual-clutch multi speed transmission and said input shaft is one of a first and a second input shaft and a plurality of gears are allocated to said input shaft.

7. A non-transitory computer readable medium storing a computer program comprising program code for controlling an electric machine during a synchronisation procedure of a first shaft and a second shaft, whereby said first shaft is in drive connection with an output shaft of said electric machine and said first shaft and said second shaft are connectable over a synchronisation mechanism, the program code, when executed by at least one processor of a device, causes the device to:
control the output shaft to an actual speed close to a target speed of said second shaft by using speed control;
continuously control an electrical torque of said electric machine, such that a torque on said output shaft becomes essentially equal to zero during the synchronisation procedure of the synchronisation mechanism; and control said synchronisation mechanism to synchronise the speed of the first shaft and the second shaft.

* * * * *